United States Patent [19]

Akerberg et al.

[11] Patent Number: 4,479,913
[45] Date of Patent: Oct. 30, 1984

[54] METHOD AND COMPOSITION FOR A RAMMING MIX IN ALUMINUM REDUCTION CELLS

[75] Inventors: Denis W. Akerberg, Huntley; Carl A. Rude, Cary, both of Ill.

[73] Assignee: QO Chemicals, Inc., Chicago, Ill.

[21] Appl. No.: 467,984

[22] Filed: Feb. 18, 1983

Related U.S. Application Data

[63] Continuation of Ser. No. 244,370, Mar. 16, 1981, abandoned.

[51] Int. Cl.³ ............................................. B29C 25/00
[52] U.S. Cl. .................................. 264/29.5; 106/284; 264/63; 264/261
[58] Field of Search ....................... 264/29.1, 29.5, 56, 264/63, 261; 106/284

[56] References Cited

U.S. PATENT DOCUMENTS

| | | | |
|---|---|---|---|
| 3,576,700 | 4/1971 | Dell | 264/29.1 |
| 3,925,092 | 12/1975 | Reamey et al. | 106/284 |
| 3,946,256 | 2/1970 | Boquist | 264/29.1 |
| 4,282,039 | 8/1981 | Bullough | 106/284 |

Primary Examiner—Paul Lieberman
Assistant Examiner—Willie J. Thompson
Attorney, Agent, or Firm—Neuman, Williams, Anderson & Olson

[57] ABSTRACT

A method and composition for joining adjacent carbon blocks in a high temperature environment including ramming a mix of calcined anthracite, resin, and a monomeric furfuryl alcohol in between the carbon blocks, curing and carbonizing.

5 Claims, 1 Drawing Figure

METHOD AND COMPOSITION FOR A RAMMING MIX IN ALUMINUM REDUCTION CELLS

This is a continuation of application Ser. No. 244,370, filed Mar. 16, 1981 and now abandoned.

This invention relates in general to adhesives for carbon bodies and in particular to a method and composition for providing a high strength bond between disparate carbon bodies under high temperature conditions.

BACKGROUND OF THE INVENTION

In the production of aluminum through electrolysis of aluminum oxide dissolved in a molten bed of cryolite or other electrolyte, the interior of an electrolytic cell is lined with prebaked carbon blocks joined together to form a unitary carbon cathode structure for the cell. The union of the carbon blocks has, in the past, generally been achieved through the use of a hot ramming mix formed from a carbonaceous aggregate such as calcined anthracite and a binder such as a high melting point pitch. This hot mixture was rammed into the spaces between adjacent blocks placed in the bottom of the cell. After compaction of the ramming mix into these spaces the assembly of blocks and joints was baked at a sufficiently high temperature to carbonize the binder, and in that manner join the individual carbon blocks together to form the unitary cathode structure. In this manner the carbon blocks not only served as a cathode but also formed an open topped container, being both the sides and bottom liner of the cell for holding the molten salt bath. As a container for the electrolyte, the absence of cracks and leaks in the carbon block liner becomes highly desirable, particularly in view of the great expense and down time associated with tearing down a cell for repair and/or reconstruction.

Recent environmental concern has been expressed over the use of the hot pitch in the fabrication of a cell with the hot ramming mix and its resultant hot toxic vapors, making desirable a binder which is nontoxic to workers during construction of a cell, while retaining the capability of keeping the cathode structure intact as a liner, with no leaks or cracks. Various cold ramming mixes consisting of aggregate, pitch and solvent for the pitch have proven ineffective in binding to the walls of the carbon blocks. The lack of an effective bond between the carbon blocks and the ramming mix allows the bath liquid to eventually penetrate between the carbon blocks to the cell bottom, thereby requiring frequent repairs and replacement, representing long periods during which the cell is inoperative (down time) thereby creating significant maintenance and operating burdens in the production of aluminum.

SUMMARY OF THE INVENTION

Therefore, an object of the subject invention is a new ramming mix for providing a strong, lasting bond between adjacent carbon blocks.

Another object of the subject invention is an improved ramming mix having a binder which may be rammed between carbon blocks at room temperature.

Still another object of the subject invention is a cold ramming mix which utilizes a furan resin as a binder.

A further object of the subject invention is a ramming mix which is capable of penetrating adjacent carbon blocks and providing a stronger bond at the interface of the carbon block and ramming mix.

Yet another object of the subject invention is the fabrication of an electrolytic cell for the production of aluminum, utilizing a carbon block structure as the cathode, with the carbon blocks being joined by a grouting mix incorporating furfuryl alcohol.

These and other objects are attained in accordance with the present invention wherein there is provided an aggregate mix having approximately 80–85 percent aggregate, 10–20 percent of a binder with the remainder including monomeric furfuryl alcohol. The binder of the subject invention comprises any resin capable of carbonizing to a 40 percent or more carbon content in a dielectric residue. Such resins include phenolic resins, furan resins, and coal tar resins. Furfural may be used in conjunction with furfuryl alcohol. A catalyst, such as zinc chloride, may be used to aid in curing the resin. The aggregate mix is prepared as above and, rammed or tamped between the carbon blocks, cured and carbonized. The resulting bond is strong, dielectric and sufficiently dense to assure that there will be no leakage through the carbonized aggregate mix itself.

Further objects of the subject invention along with additional features contributing thereto and advantages accruing therefrom, will be apparent in the following description taken of one embodiment of the subject invention when read in conjunction with the accompanying drawing wherein:

FIG. 1 is a fragmentary diagrammatic cross section of adjacent carbon blocks joined by the method and ramming mix of the subject invention.

DETAILED DESCRIPTION OF THE DRAWINGS

Figure 1:
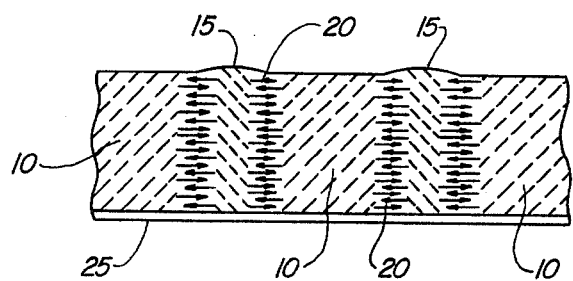

Referring now to FIG. 1, carbon blocks 10 are joined by binding mix 15. As stated above, the binding mix 15 is formed of a carbonaceous aggregate, preferably a calcined anthracite, a binder such as a resinous material, monomeric furfuryl alcohol, and a catalyst. These ingredients are mixed together to achieve a uniform and homogeneous consistency and the mix is rammed at ambient temperatures into place in the seams between adjacent carbon blocks. The entire cell is then baked in a programmed temperature rise of 10° C. per hour up to 1000° C. During the early part of this temperature rise the furfuryl alcohol polymerizes with itself as well as cross-links with the binder. This binder may be a furan resin, a phenolic resin, such as a novolak, resole or bisphenol A, resorcinol coal tar or other resinous material which may be carbonized to greater than 40 percent carbon content. Later on, during the higher temperatures, the polymerized furfuryl alcohol and the binder are carbonized. Catalysts useful with the subject invention comprise relatively weak acids, such as phthalic anhydride, maleic anhydride and phosphoric acid. Such acids show little or no increase in the viscosity of the resin systems at room temperatures, yet exhibit relatively fast cure at elevated temperatures. Zinc chloride, ammonium chloride and ferric chloride have also shown themselves to be acceptable latent catalysts, activating only at elevated temperatures.

It is postulated that during the ramming of the resin aggregate mix the ramming pressure on the mix forces the furfuryl alcohol out of solution with the aggregate and resin. Because of its wetting characteristics, the furfuryl alcohol readily penetrates the carbon block into the peripheral block areas 20. As stated above, furfuryl alcohol will polymerize on the application of heat and a catalyst, crosslinking with itself. Thus, on reaching the higher temperatures (near 1000° C.) the furfuryl alcohol polymer and the unpolymerized furfuryl alcohol, both within the carbon block and within the spaces between adjacent blocks, carbonizes, leaving an additional carbon network within both the carbon block and the ramming mix. The carbon network within the carbon block is integrally linked with the carbon network of carbonized binder and monomer at the interface of the carbon block and aggregate mix to form a strong carbon-carbon bond between the carbon block and the aggregate mix. In one such carbonized carbon block aggregate assembly, representative of all the examples to be discussed herein below, tensile strength was found to be 56–100 psi, density was 1.36 g/cc and the electrical resistivity was 0.0025 ohm-inch, all acceptable values.

A practice known as priming the carbon surfaces to be joined may be employed. Such a method involves the preparation of a second mixture of binder and monomer, such as furfuryl alcohol or furfural, and coating this second primer mixture to surfaces of adjacent carbon blocks within the cell. The aggregate mix 15 is thereafter rammed into place in between the primed carbon blocks 10 and baked as above. By priming the resin-monomer mixture onto the carbon blocks, penetration by the monomer into the carbon block should carry the resin with it into the block. When carbonized a strong carbon-carbon bond is provided between the carbon blocks and the aggregate mix.

The following examples are illustrative of the above described methods and compositions of the subject invention.

EXAMPLE 1

1200 grams of calcined anthracite were mixed with 150 grams furfuryl alcohol resin of approximately 13000 cps. (a furan resin available from the Ouaker Oats Company), 150 grams of furfuryl alcohol and 30 grams of zinc chloride in 50 percent ethanol solution. The above mixture was mixed to a uniform consistency, compacted or tamped into place between two carbon blocks in the following manner: Two 5"×5"×2" carbon blocks were held two inches apart, with the ends and bottom sealed, thereby leaving a 5"×5"×2" space in between the blocks. The mixture was "rammed" or tamped into this space and cured for 2 hours at 200° F. and 16 hours at 300° F. The resulting cured carbon block assembly was carbonized by increasing its temperature at 10° C./hr. until 1000° C. was reached. The resulting carbonized assembly was tested for tensile force, i.e. the force required to pull the ramming mix from the carbon block. A high adhesion or bond of the block to the ramming mix was noted.

EXAMPLE 2

1200 grams of calcined anthracite were mixed witn 300 grams of a furfuryl alcohol-phenolic novolak resin and 30 grams of zinc chloride (50 percent ethanol solution). The above mixture was mixed to a uniform consistency, compacted or tamped into place between two carbon blocks, cured and carbonized pursuant to the procedure of Example 1. The resulting carbonized assembly was tested for tensile strength, i.e., the force required to pull the ramming mix from the carbon block. A high adhesion or bond of the block to the ramming mix was noted.

EXAMPLE 3

1200 grams of calcined anthracite were mixed with 150 grams CP-524, a coal tar available from Allied Chemical, 150 grams of furfuryl alcohol, and 30 grams of zinc chloride (50 percent ethanol solution). The above mixture was mixed to a uniform consistency, compacted or tamped into place between carbon blocks, cured and carbonized according to the procedure of Example 1. The resulting carbonized assembly was tested for tensile strength, i.e. the force required to pull the ramming mix from the carbon block. A high adhesion or bond of the block to the ramming mix was noted.

EXAMPLE 5

960 grams of calcined anthracite were mixed with 120 grams Reilly Coal Tar OG-5009, available from Reilly Chemicals, 120 grams of furfuryl alcohol and 24 grams of zinc chloride (50 percent ethanol solution). The above mixture was mixed to a uniform consistency, compacted or tamped into place between carbon blocks, cured and carbonized according to the procedure of Example 1. The resulting carbonized assembly was tested for tensile strength, i.e., the force required to pull the ramming mix from the carbon block. A high adhesion or bond to the ramming mix was noted.

EXAMPLE 6

1200 grams of calcined anthracite were mixed with 300 grams of a furfuryl alcohol resin having approximately 20 percent by weight of furfural, and with a viscosity of approximately 400 cps; and 30 grams of zinc chloride solution (50 percent in water). A separate priming solution of the furfuryl alcohol resin and approximately 10 percent by weight $ZnCl_2$ solution was prepared. The adjoining walls of the carbon blocks were brushed or coated with this priming solution. The ramming mixture was mixed to a uniform consistency, compacted or tamped into place between the primed carbon blocks and cured 2 hours at 200° F., and 16 hours at 300° F. The resulting cured carbon block assembly was carbonized by raising the temperature 10°/Hr. until 1000° C. was reached. The resulting carbonized assembly was tested for tensile strength, i.e., the force required to pull the ramming mix from the carbon block. A good ahesion or bond between the block and ramming mix was noted.

While the subject invention has been described particularly with reference to forming the bond between adjacent carbon blocks, the aggregate mix of the subject invention may be utilized as a peripheral mix in filling outside the carbon blocks in the cell, as well as other high temperature binder and sealant uses, where high density, carbonaceous bonds or sealants are required.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling without the scope of the appended claims.

We claim:

1. A method for joining adjacent carbon blocks with a high temperature polymerizable ramming mix, wherein the mix is rammed at ambient temperature between the adjacent blocks, comprising the steps of:
   a. preparing the high temperature polymerizable ramming mix by admixing, at ambient temperature: approximately 80–85 percent calcined anthracite: approximately 10–20 percent of a binder capable of carbonizing to over 40 percent carbon content based on the weight of the binder; approximately 5–10 percent monomeric furfuryl alcohol; and a catalytic amount of a heat activated polymerizing catalyst;
   b. ramming said ramming mix at ambient temperature between said adjacent carbon blocks;
   c. allowing the monomeric furfuryl alcohol to penetrate into said adjacent carbon blocks; and
   d. baking said carbon blocks to cure the binder material, wherein the temperature is slowly raised to a temperature at which the binder material carbonizes;

whereby the carbonized binder provides a strong carbon-carbon bond with said adjacent carbon blocks.

2. The method of claim 1 wherein the binder comprises a resinous material selected from the group consisting of furan resins, phenolic resins, and liquid coal tar.

3. The method of claim 1 wherein the binder comprises a material selected from the group consisting of resorcinol, bisphenol-A, resoles, novolaks and combinations thereof.

4. The method of claim 1 wherein the catalyst is selected from the group consisting of zinc chloride, maleic anhydride, phthalic anhydride, ferric chloride and ammonium chloride.

5. The method of claim 1 wherein the ramming mixture consists essentially of:
   a. approximately 80 percent calcined anthracite;
   b. 10–15 percent resinous material;
   c. 7–9 percent monomeric furfuryl alcohol;
   d. 1–3 percent furfural; and
   e. 1–2 percent of a 50 percent solution of zinc chloride in a 50 percent solution in ethanol.

* * * * *